United States Patent [19]

Le Mouel

[11] 3,919,651

[45] Nov. 11, 1975

[54] PHASE DIFFERENTIAL MODULATION FREQUENCY AUTOMATIC CORRECTING DEVICE

[75] Inventor: Bernard Le Mouel, La Roche Derrien, France

[73] Assignee: Societe Lannionnaise d'Electronique Sle-Citerel, France

[22] Filed: Apr. 19, 1974

[21] Appl. No.: 462,533

[30] Foreign Application Priority Data

Apr. 19, 1973 France .............................. 73.14467

[52] U.S. Cl. ................ 329/104; 325/320; 325/419; 329/122; 331/23

[51] Int. Cl.[2] ...................... H03D 3/18; H04L 27/22

[58] Field of Search ............................ 329/122–126; 331/23, 25, 18; 325/346, 419, 320

[56] References Cited

UNITED STATES PATENTS

| | | | |
|---|---|---|---|
| 3,646,447 | 2/1972 | VanGerwen | 329/122 X |
| 3,753,114 | 8/1973 | Burley | 329/122 X |
| 3,787,775 | 1/1974 | Lanning | 331/23 X |
| 3,838,350 | 9/1974 | Ewanus et al. | 329/122 X |

*Primary Examiner*—Alfred L. Brody

*Attorney, Agent, or Firm*—Craig & Antonelli

[57] ABSTRACT

Correcting device ensuring automatically, at the receiving end, an exact timing of the frequency demodulated at the rated value, that timing being necessary for the demodulation to be effected properly, the correction being effected by a frequency servo-controlling based on an error signal extracted from a frequency discriminator in determined conditions.

7 Claims, 5 Drawing Figures

PHASE DIFFERENTIAL MODULATION FREQUENCY AUTOMATIC CORRECTING DEVICE

The invention comes within the branch of data transmission by modulation of a carrier by phase jump or differential phase. It concerns a corrector device ensuring automatically, at the receiving end, an exact timing of the demodulated frequency at the rated value, that timing being necessary for the demodulating to take place correctly, the correction being made by a servo-controlling of the frequency of a local oscillator based on an error signal extracted from a frequency discriminator in determined conditions.

In the transmission by differential phase modulation, the proper operation of the demodulation requires a great stability of the frequency arriving on the demodulator, due to the fact that the demodulator contains delay lines which are dimensioned to give a quite accurate dephasing at the rated frequency: if the frequency deviates from the rated value, the rated dephasing is no longer obtained and the demodulator causes errors in demodulation. An automatic frequency correction is therefore necessary.

The known solution for producing such a device consists, for a received modulated wave having n phase states, in multiplying the frequency by n, this being the equivalent to erasing the phase modulation in the multiplied frequency wave; then, a frequency discriminator provides an error voltage which is applied to a transposition oscillator which brings the frequency arriving at the demodulator back to the rated value (frequency servo-controlling). That solution may be difficult to produce if the frequency received by the demodulator is high.

The invention overcomes that difficulty by effecting the whole processing at the received intermediate frequency.

For that purpose, the invention makes use of a frequency discriminator known per se, which receives the phase-modulated wave $\omega_0$ and is followed by a sampling means which effects samplings on the output signal of the discriminator at adjusted periods, for suitable values of the parameters, so as to fall on a zero signal, in the case where the carrier frequency has the rated value and on an error signal in the contrary case. The frequency discriminator used is, in fact, constructed like a phase discriminator, for example, a ring-type modulator, receiving, on an input, the direct wave and on another input the wave delayed by an instant $\tau$. If the dephasing $\omega\tau$ constitutes a quadrature, the discriminator supplies a zero output voltage. Otherwise, the output voltage is positive or negative according to the polarity of the phase shift.

The basic principle is applied in one or the other of two forms.

According to a first embodiment, the logic pulse trains leaving the demodulator (for example, two pulse trains in the case of a modulation having four phase jumps, 0, $\pi/2$, $\pi$, $3\pi/2$ or $-\pi/2$) provide logic configurations certain of which correspond to a dephasing of $\pm\pi/2$.

By energizing the sampling means by the decoded states corresponding to a dephasing by + or $-\pi/2$ of the received wave, the required error signal (for example the instant $\pi$ equal to a bit instant), is obtained at the output of the discriminator which is dimensioned in consequence.

According to a second embodiment, a delay (less than the duration of an unitary moment) is applied to each moment of the received wave, so that at the expiry of that delay, the delayed wave is in quadrature with the received wave: during the last part of each moment, two waves in quadrature therefore arrive on the discriminator: by timing suitably the sampling scale, the output signal of the discriminator is sampled throughout the duration of the quadrature. Here, the internal delay of the frequency discriminator is less than a bit instant.

The invention will be described in detail with reference to examples of embodiment and to the accompanying figures, among which:

Figure 1:
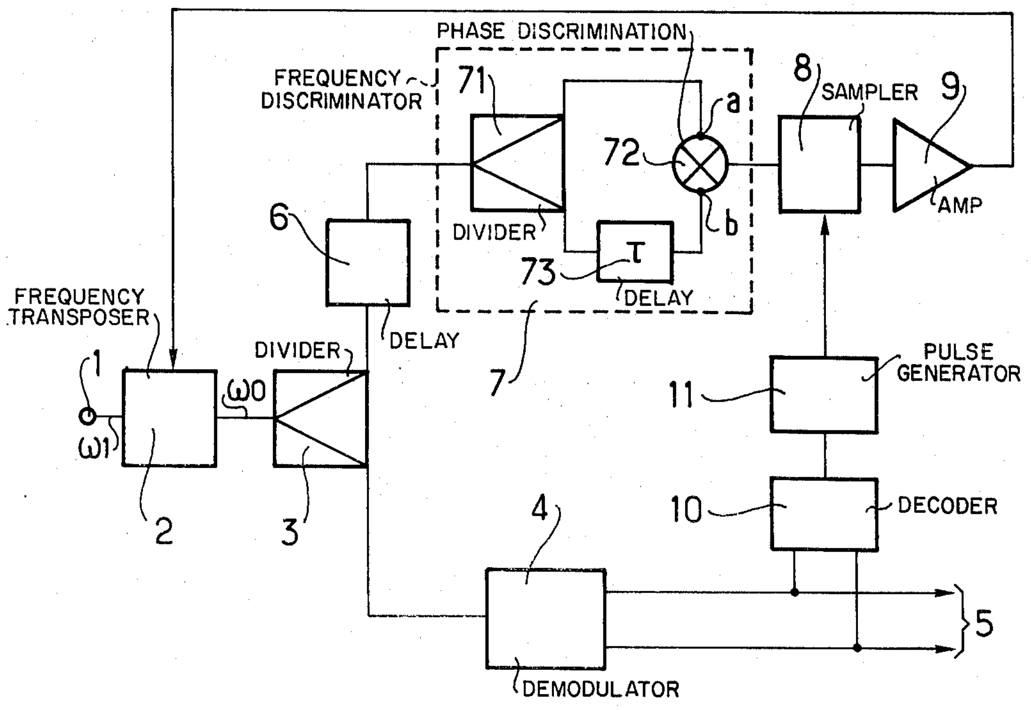
FIG. 1 is a diagram of a first embodiment.
Figure 2:
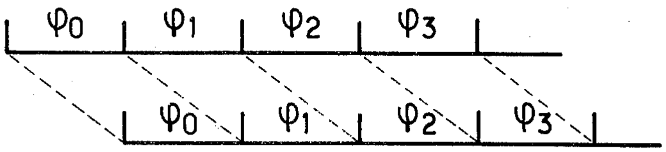
FIG. 2 is a graph making it easier to understand the assembly according to FIG. 1.

FIGS. 1 and 2 - A differential phase modulation wave having a pulse of $\omega 1$ arrives through a terminal 1. It is transposed by well-known means 2 into an intermediate frequency wave having a rated pulse of $\omega o$.

The pulse wave $\omega o$ is applied to a power divider 3, which applies it on the one hand, to a demodulator 4 which sends out, at the output, logic trains 5. The figure illustrates the case of two logic trains, corresponding to four phase jumps, as is known. In a general way, for a modulation having $2^m$ phase jumps, the demodulator 4 supplies m logic trains 5 and comprises $m'$ unitary demodulators, with $m' > m$.

On another output of the element 3, there are, in series, a delay element 6, a frequency discriminator 7, a sampling element 8, an amplifier 9, which can apply an error correction signal to an oscillator having a variable frequency contained in the element 2.

The output trains 5 are applied to a logic state decoder 10 which decodes logic configurations corresponding to a quadrature of the received wave: for a modulation having four phase jumps, two output trains, there are two quadrature configurations $\pm\pi/2$. The decoder 10 may control a generator 11 of fine pulses, which energized the sampling means 8.

The frequency discriminator 7 comprises, at the input, a power divider 71, one of whose outputs is connected up directly to a first input of a phase discriminator 72 and whose other output is connected up to a second input b of the phase discriminator through a delay line 73 having a delay duration of $\tau$.

The delay $\tau$ is dimensioned to the value of a bit instant.

If it is admitted, as in FIG. 2, first like, that the successive bit instants applied directly to the phase discriminator 72, input a, have a phase of $\phi 0$, $\phi 1$, $\phi 2$, etc., the bits applied with a delay of $\omega_0 \tau$ on the input b are shifted by one unit, as may be seen on the second line in FIG. 2.

The quadrature detected by the decoder 10 must correspond to the quadrature between the two bits applied to the phase discriminator 72, a sampling effected at the same instant therefore provides, at the output of the frequency discriminator 7, a zero signal if the frequency is correct.

The delay brought about by the element 6 is adjusted experimentally so as to compensate the operation time of the various elements, more particularly of the demodulator 4. It is, in general, in the order of 1 to 3 bit instants.

Figure 3:
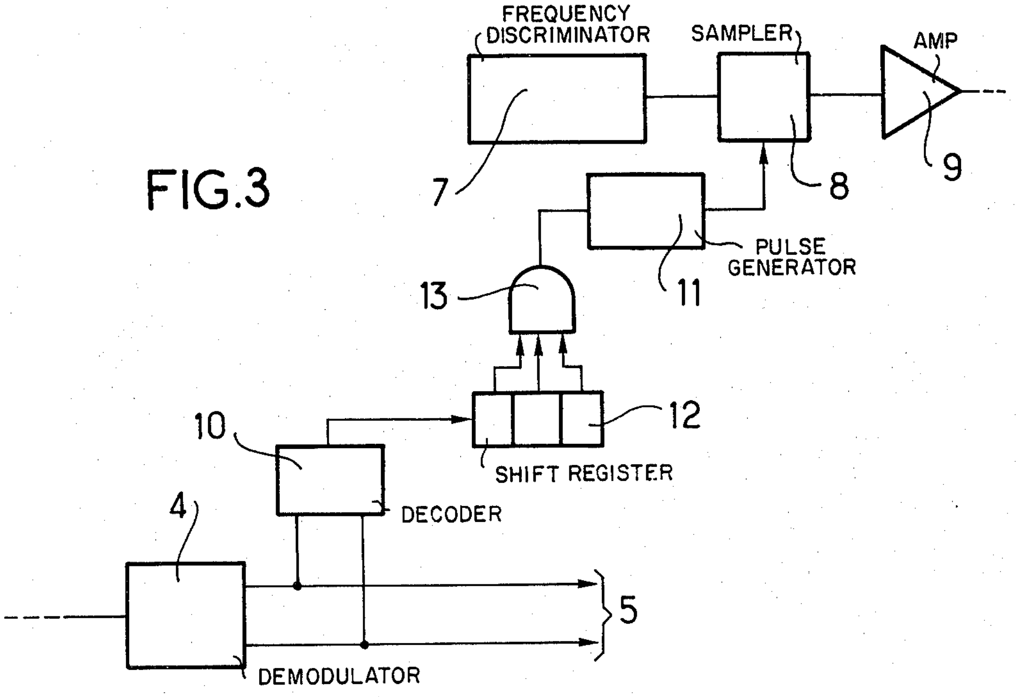
FIG. 3 is a partial diagram of a variant of the assembly according to FIG. 1.

FIG. 3 - FIG. 3 corresponds to a variant of the device according to FIG. 1, introducing the following improvement:

The wave received has undergone filtrations during the emitting and the receiving: the connections between the dephased moments are not provided in the form of gating pulses having a strict geometrical shape; the filtering circuits round off the contours. It is therefore an advantage to select the taking of a sample on the phase jumps which are the least affected by the filtrations, for example taking a sample on a phase jump preceded and followed by a zero phase jump. For that purpose, the delay used in the discriminator must be adjusted: an extra dephasing of $\pm\pi/2$ is added in the case of four phases, the shift produced (FIG. 2) not exceeding a few % of a bit instant. The decoder 10 will also be modified in consequence.

In the assembly according to FIG. 3, the decoded "zero dephasing" states leaving the decoder 10 pass permanently through a shift register 12. The situation "three successive zero phase jumps" is detected by an AND gate 13, which trips the sampling pulse generator 11. The remainder of the assembly is identical to the diagram according to FIG. 1.

Figure 4:
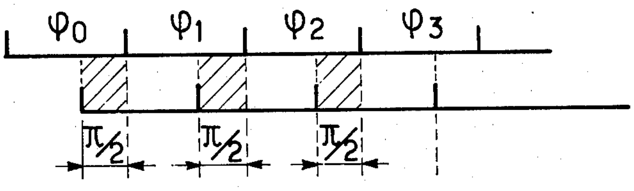
FIG. 4 is a graph corresponding to a second embodiment.
Figure 5:
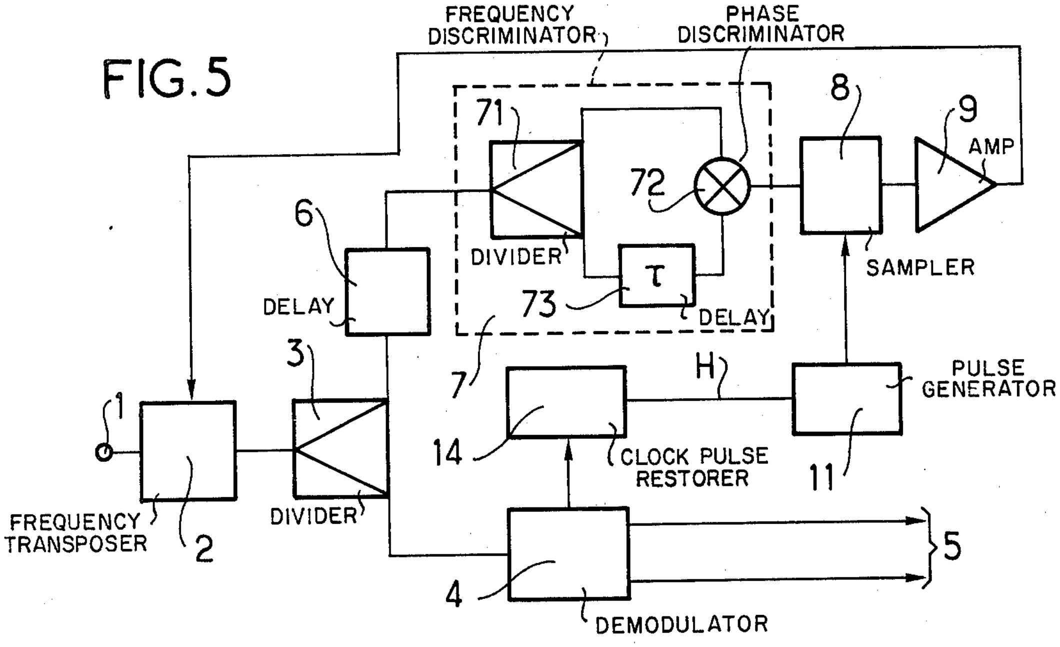
FIG. 5 is a diagram corresponding to a second embodiment.

FIGS. 4 and 5 - According to the other embodiment of the invention, the delay of the element 73 within the frequency discriminator 7 is adjusted so as to obtain, at each bit instant, a terminal portion of the delayed bit instant, a terminal portion of the delayed bit instant which is in quadrature with the non-delayed bit instant. That situation is shown in FIG. 4: it may be seen that during the last portion of the duration of a bit instant, having a phase of $\phi$0, $\phi$1, $\phi$2, etc. there is quadrature between the non-delayed bit and the delayed bit (shaded zone).

The sampling is then trippled by a clock H shifted so as to trip the sampling pulse in the portion in quadrature.

In FIG. 5, where the references common to FIG. 1 have the same meaning, the clock pulse is scavenged by an element 14, well-known in the art and which, for that reason, will not be described in detail. In the case where there is a prolonged succession of zero dephasings, the preserving of the clock pulses is ensured by circuits having very slight decrement (overvoltage equivalent to several thousands) which are known.

The adjusting of the element 6 ensures the correct timing of the clock pulse.

The comparison with the solution according to FIG. 1 gives the following results:

The solution according to FIG. 5 is less sensitive; the error signal at the output of the frequency discriminator 7 does not exceed a few millivolts: it requires therefore circuits having great stability.

On the other hand, it admits a greater band width. Indeed, a phase discriminator such as the element 72 has a monotonous operating characteristic on a phase range of $\pm\pi/2$. For a total variation of pulse $\Delta\omega$ such as $\Delta\omega\tau \leq \pi$, the smaller $\tau$ is, the greater admissible $\Delta\omega$ will be. Now, in the assembly according to FIG. 1, the delay is, in principle equal to a bit instant, whereas it is less than a bit instant in the assembly according to FIG. 5.

One solution or the other could therefore be preferred according to the case in question.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intent to cover all such changes and modifications as are obvious to one of ordinary skill in the art.

What is claimed is:

1. An automatic frequency corrector for a local oscillator used for a frequency transposition for a demodulator of a differential phase modulated wave comprising a phase discriminator receiving on a first input said modulated wave and on a second input the same modulated wave delayed by an instant $\tau$, a sampling unit having one input connected to the output of said phase discriminator, a pulse generator connected to a second input of said sampling unit, and control means responsive to said modulated wave for triggering said pulse generator at the instants when the output of said phase discriminator is zero at a selected frequency and when the output of said phase discriminator is non-zero at all other frequencies.

2. An automatic frequency corrector as defined in claim 1 further including means for dividing said modulated wave into first and second identical signals, a delay unit receiving said first signal and connected to said phase discriminator, and means applying said second signal to said control means.

3. An automatic frequency corrector as defined in claim 2 wherein said control means includes a demodulator receiving said second signal and a decoder connected between the output of said demodulator and the input of said pulse generator.

4. An automatic frequency corrector as defined in claim 3 wherein the instant $\tau$ corresponds to a quadrature of the modulated wave.

5. An automatic frequency corrector as defined in claim 3 wherein said control means includes a shift register connected to the output of said decoder and logic means connected between said shift register and said pulse generator for triggering said pulse generator only in response to a predetermined number of successive logic states corresponding to a zero dephasing of said modulated wave.

6. An automatic frequency corrector as defined in claim 1, wherein said oscillator transposes said modulated wave into an intermediate frequency wave, said intermediate frequency wave being applied to the inputs of said phase discriminator, and wherein means responsive to said sampling unit is included for applying an error correction signal to said oscillator.

7. An automatic frequency corrector as defined in claim 6, wherein said oscillator includes a variable frequency oscillator.

* * * * *